United States Patent [19]

Thomson

[11] Patent Number: 4,657,696

[45] Date of Patent: Apr. 14, 1987

[54] SCINTILLATION COUNTING MEDIUM AND COUNTING METHOD

[75] Inventor: James Thomson, Coalville, England

[73] Assignee: Fisons plc, Ipswich, England

[21] Appl. No.: 776,615

[22] Filed: Sep. 16, 1985

[30] Foreign Application Priority Data

Sep. 19, 1984 [GB] United Kingdom ............... 8423636

[51] Int. Cl.$^4$ .................... C09K 11/06; G01T 1/20
[52] U.S. Cl. ........................ 252/301.17; 250/361 R; 250/362
[58] Field of Search ............. 252/301.17; 250/361 R, 250/362

[56] References Cited

U.S. PATENT DOCUMENTS 3,600,445  8/1971  Wirth et al. .................. 252/301.17
4,127,499  11/1978  Chen et al. ................... 252/301.17
4,444,677  4/1984  Edelstein et al. ............. 252/301.17

FOREIGN PATENT DOCUMENTS 2644624  4/1978  Fed. Rep. of Germany .

OTHER PUBLICATIONS

Chemical Abstracts (I) 10th Coll. Index, p. 32855CS.
Kirk-Othmer Encyclopedia of Chemical Technology, 3rd ed. vol. 15, pp. 716–717.
Schram Organic Scintillation Detections; Elsevier, Publ. Co. Amsterdam, 1963, pp. 44–45.
Chemical Abstracts (II) 9th Collective, p. 24007CS.

Primary Examiner—Arthur P. Demers
Attorney, Agent, or Firm—Marshall, O'Toole Gerstein, Murray & Bicknell

[57] ABSTRACT

There is described a scintillation medium comprising at least one diisopropylnaphthalene, wherein said at least one diisopropylnaphthalene is liquid at a temperature of 5° C.

There is also described a method of detecting β-ray emissions using the scintillation medium.

8 Claims, No Drawings

SCINTILLATION COUNTING MEDIUM AND COUNTING METHOD

This invention relates to new scintillation media and to methods of detecting β-ray emissions.

Scintillation detection methods are known in which the energy from a radioactive decay, usually a β-ray emission, are transmitted via an aromatic compound to a fluor.

In liquid scintillation counting, the aromatic compound also acts as solvent, and flashes of light emitted by the fluor are counted by means of conventional photomultiplying and counting techniques. The aromatic solvent medium must be liquid at the temperature at which it is to be used, which is normally room temperature or below (e.g. when refrigerated systems are used).

Conventionally used solvents include toluene, xylenes, cumenes, ethylbenzene, 1,3,5-triethylbenzene, phenylcyclohexane, anisole and dioxan containing a small portion, e.g. 20 g per liter, of dissolved naphthalene. Other solvents which have been used are mineral oils and mono-, di- and tri-alkyl benzenes in which the alkyl groups each contain up to 12 carbon atoms.

These solvents suffer from the disadvantage that they have relatively high vapour pressures, relatively low flash points, relatively high rates of permeation through polyethylene and other plastics materials, are easily quenched, have a relatively high toxicity and/or have a tendency to form coloured compounds with basic materials, such as quaternary ammonium hydroxide, which are sometimes used in liquid scintillation counting media. Furthermore, certain scintillation solvents are very expensive.

A particular disadvantage of many liquid scintillation counting solvents occurs when scintillation vials of plastics material are used. Certain solvents have a tendency to penetrate the plastics wall of the vial. Over a period of time (1–72 hours) the scintillant diffuses into the wall of the vial causing an apparent error in the measurement of quenching. This leads to an error in the calculation of efficiency and hence decompositions per minute (dpm).

We have now found a group of compounds having advantageous properties as solvents for scintillation counting.

According to the invention there is provided a scintillation medium comprising at least one diisopropylnaphthalene, wherein said at least one diisopropylnaphthalene is liquid at a temperature of 5° C.

Preferably the at least one diisopropylnaphthalene is liquid at a temperature of −5° C., more preferably −15° C. and especially −25° C.

We prefer the at least one diisopropylnaphthalene to be a mixture of positional isomers of diisopropylnaphthalene. Isomers that may be particularly mentioned include 1,3-; 1,4-; 1,6-; 1,7-; 2,6- and 2,7-diisopropylnaphthalene. We prefer the mixture to contain from 10 to 30% w/w 1,3-diisopropylnaphthalene, e.g. 18%. We prefer the mixture to contain from 5 to 20% w/w 1,4-diisopropylnaphthalene, e.g. 10%. We prefer the mixture to contain from 10 to 25% w/w 1,6-diisopropylnaphthalene, e.g. 15%. We prefer the mixture to contain from 10 to 25% w/w 1,7-diisopropylnaphthalene, e.g. 15%. We prefer the mixture to contain from 10 to 30% w/w 2,6-diisopropylnaphthalene, e.g. 19%. We prefer the mixture to contain from 10 to 25% w/w 2,7-diisopropylnaphthalene, e.g. 16%.

We prefer mixtures of diisopropylnaphthalene which include the 1,3-; 2,6- and 2,7- isomers.

Suitable liquid diisopropylnaphthalenes may be prepared by acid catalysed prenylation of naphthalene at a temperature of from about −10° to 25° C.

When used as liquid scintillation solvents, the at least one diisopropylnaphthalene is preferably used without additional scintillation solvents. However, diisopropylnaphthalene may also be used in admixture with one or more other liquid scintillation solvents, e.g. those mentioned above. The scintillation medium may also be used in admixture with another, non-scintillating, solvent. We prefer the mixture to contain mineral oil, white spirits, terpenes, dioxan, petroleum fractions, alkoxy benzenes, e.g. anisole, and/or alkyl benzenes, the mixture containing from 0–75% v/v, preferably 2–50%, more preferably 10–40% v/v, e.g. 30% v/v, of the liquid diisopropylnaphthalene.

The scintillation medium may, in certain circumstances, function adequately without an additional fluor. For example, the scintillation detection medium may be used in chromatographic systems, e.g. thin layer chromatography (t.l.c.) plates, as a scintillant in the technique of fluorography. Fluorography, also known as scintillography, is a technique in which scintillations are detected by exposing an appropriately sensitive film in close contact with a scintillant coated t.l.c. plate bearing a β-ray emitter, e.g. $^3H$ or $^{14}C$.

However, the scintillation detection medium preferably contains an additional fluor. Suitable fluors are well known in the art and include, for example 2,5-diphenyloxazole, p-terphenyl, 2-(4'-t-butylphenyl)-5-(4''-biphenyl)-1,3,4-oxadiazole and 2,5-bis(5-t-butylbenzoxalolyl)-thiophene.

The scintillation detection medium may also contain a secondary scintillator, e.g. 1,4-di-(2-methylstyryl)benzene, 1,4-bis-[4-methyl-phenyl-2-oxazolyl]benzene or 2,5-di(biphenyl)-oxazole.

When the scintillation medium is employed as a liquid scintillation counting medium, particularly when aqueous samples are to be analysed, the medium may also contain one or a mixture of surfactants, e.g. a non-ionic surfactant such as a polyethoxylated alkyl (e.g. octyl) phenol, an alcohol (e.g. lauryl) ethoxylate, an anionic surfactant, e.g. a dialkyl sulphosuccinate, a cationic surfactant, e.g. an alkyl quaternary ammonium compound, or an amphoteric surfactant, e.g. an alkyl imidazoline.

The proportion of the various optional components in the scintillation detection medium can vary over a wide range and will be well known to those skilled in the art. In particular, the scintillation medium may contain from 0.001 to 5% w/w of the fluor. Typical scintillation "cocktails" are described in, for example, Brian W Fox: "Techniques of sample preparation for liquid scintillation counting", North Holland Publishing Co, Amsterdam, 1976; E Branson Jr: "Current status of liquid scintillation counting", Grune and Stratton, New York; and Anderson and McClure, Anal. Biochem. 51 173 (1973).

According to the invention there is also provided a method of detecting β-ray emissions using a scintillation medium, in which the scintillation medium comprises at least one diisopropylnaphthalene wherein said at least one diisopropylnaphthalene is liquid at a temperature of 5° C.

The scintillation media of the invention are advantageous in that they have relatively high flash points, relatively low vapour pressures, relatively low rates of permeation through polyethylene and other plastics material, are more resistant to quenching, have relatively low toxicity, are virtually odour free, do not attack polymethylmethacrylate glasses and/or have a tendency to form coloured compounds with basic materials, compared to known media.

In addition the scintillation media are particularly suited to large volume scintillation apparatus, e.g. whole body counters having a capacity of circa 50,000 liters, in that the media have a high light output and a low cost.

The invention is illustrated but in no way limited by the following examples.

EXAMPLE 1

Liquid scintillation counting medium.

| | |
|---|---|
| 2,5-diphenyloxazole | 3 g |
| 1,4-di-(2-methylstyryl)benzene | 0.1 g |
| Diisopropylnaphthalene | 1 liter |

EXAMPLE 2

Liquid scintillation counting medium for aqueous samples.

| | |
|---|---|
| Diisopropylnaphthalene | 2 parts |
| Nonylphenolethoxylate containing 6 moles of ethylene oxide | 1 part |

To the solution are added:

| | |
|---|---|
| 2,5-diphenyloxazole | 6 g/liter |
| 1,4-bis-[4-methyl-5-phenyl-2-oxazolyl]benzene | 0.1 g/liter |

EXAMPLE 3

Plastics vial wall effect

Using the standard settings in an LKB 1217 Rackbeta Counter (Rackbeta is a Trademark) and an external Ra 226 standard, the change in External Standard Ratio v Time was monitored for the following liquid scintillation solvents: xylene, toluene, pseudocumene and diisopropylnaphthalene (DIN).

| | Xylene | Toluene | Pseudocumene | DIN |
|---|---|---|---|---|
| Time = 0 Efficiency, % | 53.5 | 53.4 | 56.0 | 56.8 |
| Time = 5 hrs Efficiency % | 50.0 | 51.0 | 53.0 | 56.6 |
| Time = 25 hrs Efficiency % | 46.5 | 46.5 | 50.0 | 56.0 |
| Time 50 hrs Efficiency % | 44.5 | 44.3 | 48.3 | 56.0 |
| Time 70 hrs Efficiency % | 44.0 | 43.6 | 47.4 | 56.0 |

The reduced efficiencies observed for xylene, toluene and pseudocumene are caused by absorption of the solvent into the vial wall, which leads to a distortion of the Compton spectrum and a miscalculation of the quenching. This in turn leads to an underestimate of the efficiency and hence an overestimate in the decomposition per minute.

EXAMPLE 4

Quench resistance

The effects of chemical and colour quenching agents on the counting efficiency of diisopropylnaphthalene and pseudocumene were measured under identical conditions, using an internal source, using Stern-Volmer plots. A comparative of the resistance to the effect of these quenching agents is obtained by considering the quantity of reagent required to reduce the counting efficiency to 50% of its initial value.

| | Pseudocumene | DIN |
|---|---|---|
| (a) Colour quench | | |
| Volume of saturated solution of Dimethyl Yellow required to reduce efficiency to 50% of initial value | 332 µl | 440 µl |
| (b) Chemical quench | | |
| Volume of carbon tetrachloride required to reduce efficiency to 50% of initial value | 47.5 µl | 71.25 µl |

In each of Examples 1–4, the diisopropylnaphthalene had the following isomer composition:

| | % w/w |
|---|---|
| 1,3- | 18 |
| 1,4- | 10 |
| 1,6- | 15 |
| 1,7- | 15 |
| 2,6- | 19 |
| 2,7- | 16 |

I claim:

1. A scintillation medium comprising at least one diisopropylnaphthalene and an additional fluor, wherein said at least one diisopropylnaphthalene is liquid at a temperature of 5° C.

2. A scintillation medium according to claim 1, wherein said at least one diisopropylnaphthalene is liquid at a temperature of −5° C.

3. A scintillation medium according to claim 1, wherein said at least one diisopropylnaphthalene comprises a mixture of positional isomers of diisopropylnaphthalene.

4. A scintillation medium according to claim 3, wherein said positional isomers include 1,3-; 2,6- and 2,7-diisopropylnaphthalene.

5. A scintillation medium according to claim 3, wherein said positional isomers include 1,3-; 1,4-; 1,6-; 1,7-; 2,6- and 2,7-diisopropylnaphthalene.

6. A scintillation medium according to claim 3, wherein said at least one diisopropylnaphthalene comprises from 10 to 30% w/w 1,3-diisopropylnaphthalene, from 5 to 20% w/w 1,4-diisopropylnaphthalene, from 10 to 25% w/w 1,7-diisopropylnaphthalene, from 10 to 30% w/w 2,6-diisopropylnaphthalene and from 10 to 25% w/w 2,7-diisopropylnaphthalene.

7. A scintillation medium according to claim 1, wherein the fluor is 2,5-diphenyloxazole, p-terphenyl, 2-(4'-t-butylphenyl)-5-(4"-biphenyl)-1,3,4-oxadiazole or 2,5-bis(5-t-butylbenzoxaloyl)thiophene.

8. A method of detecting b-ray emissions using a scintillation medium in accordance with claim 1.